United States Patent [19]
Clay et al.

[11] Patent Number: 5,991,700
[45] Date of Patent: Nov. 23, 1999

[54] EMI STABILITY INDICATOR FOR TYMPANIC THERMOMETER

[75] Inventors: Bradford G. Clay, Maryland Heights, Mo.; John J. Korff, Vista, Calif.

[73] Assignee: Sherwood Services, A.G., Switzerland

[21] Appl. No.: 08/950,711

[22] Filed: Oct. 15, 1997

[51] Int. Cl.[6] .................................................. G01K 7/00
[52] U.S. Cl. ........................ 702/131; 702/132; 374/163
[58] Field of Search ................................ 702/131–132, 702/64–65, 99; 374/2, 126, 129, 131–133, 164, 183, 100, 163; 600/473–475, 549

[56] References Cited

U.S. PATENT DOCUMENTS

| | | | |
|---|---|---|---|
| 3,851,528 | 12/1974 | Nichol et al. | 374/208 |
| 3,937,086 | 2/1976 | Von Thuna | 73/359 |
| 4,140,393 | 2/1979 | Cetas | 356/43 |
| 4,159,648 | 7/1979 | Prosky | 374/163 |
| 4,245,507 | 1/1981 | Samulski | 73/356 |
| 4,377,171 | 3/1983 | Wada | 600/549 |
| 4,447,884 | 5/1984 | Wada | 702/131 |
| 4,464,067 | 8/1984 | Hanaoka | 702/131 |
| 4,469,451 | 9/1984 | Kunetka et al. | 374/136 |
| 4,536,851 | 8/1985 | Germanton et al. | 702/131 |
| 4,561,448 | 12/1985 | Buchas | 128/733 |
| 4,575,259 | 3/1986 | Bacci et al. | 374/130 |
| 4,602,642 | 7/1986 | O'Hara et al. | 600/474 |
| 4,678,905 | 7/1987 | Phillips | 250/227 |
| 4,790,324 | 12/1988 | O'Hara et al. | 374/126 |
| 4,900,162 | 2/1990 | Beckman et al. | 374/132 |
| 5,123,102 | 6/1992 | Puckette | 395/550 |
| 5,159,936 | 11/1992 | Yelderman et al. | 600/549 |
| 5,167,235 | 12/1992 | Seacord et al. | 374/136 |
| 5,228,780 | 7/1993 | Shepard et al. | 374/175 |
| 5,255,068 | 10/1993 | Emo et al. | 356/351 |
| 5,282,685 | 2/1994 | Koegler | 374/172 |
| 5,293,877 | 3/1994 | O'Hara et al. | 374/131 |
| 5,305,760 | 4/1994 | McKown et al. | 128/692 |

OTHER PUBLICATIONS

Protecting Medical Devices for Electromagnetic Interference; William D. Kimmel and Darly D. Gerke; 3rd Ed., Designer's Handbook: Mecial Electronis; pp.34–43; Canon Camera Inc.; 1994.

CDRH Laboratory Evaluation of Medical Devices for susceptibility to Radio–Frequency Interference; Howard I. Bassen et al; Designer's Handbook: Medical Electronics: pp. 44–49; Canon Camera Inc.; 1994.

*Primary Examiner*—Marc S. Hoff
*Assistant Examiner*—Bryan Bui
*Attorney, Agent, or Firm*—Lewis, Rice & Fingersh, L.C.

[57] ABSTRACT

The present invention is directed to an electronic device for sensing and indicating the presence of electromagnetic interference in the vicinity of a electronic thermometer and preventing the display of a core body temperature reading when the electromagnetic interference exceeds a predetermined threshold. Disclosed is a tympanic thermometer comprising circuitry and a microprocessor that takes a a plurality of voltage readings from the null input of an operational amplifier in the circuitry. After taking into account ambient temperature conditions into the temperature calculations, the microprocessor compares the average value of the voltage readings taken from the null input against a predetermined threshold in the memory of the microprocessor. If the value exceeds the predetermined threshold, then the microprocessor prevents the display of the core body temperature and directs a display to write an error message. However, if the value does not exceed the predetermined threshold, the microprocessor directs the displays the core body temperature taken by the tympanic thermometer.

15 Claims, 6 Drawing Sheets

EMI STABILITY INDICATOR FOR TYMPANIC THERMOMETER

BACKGROUND OF THE INVENTION

1. Field of the Invention

This invention relates generally to an electronic device for indicating the presence of electromagnetic interference (EMI). More specifically, the present invention relates to a stability indicator in a electronic device for detecting and indicating the presence of a high electromagnetic field in the immediate vicinity of the device. In particular, the present invention relates to a fail-safe detection circuit embodied in a tympanic thermometer that prevents the taking of a temperature reading in the presence of high EMI event and displays a warning.

2. Prior Art

The diagnosis and treatment of many body ailments depends upon an accurate reading of the internal or core temperature of a patient's body, and in some instances, upon comparison to a previous body temperature reading. For many years, the most common way of taking a patient's temperature involved utilization of Mercury thermometers. However, such thermometers are susceptible to breaking and must be inserted and maintained in the rectum, axilla or mouth for several minutes, often causing discomfort to the patient.

Because of the drawbacks of conventional Mercury thermometers, electronic thermometers were developed and are now in widespread use. Typically, such electronic thermometers have a probe connected by wires to a remote unit containing electronic circuitry. The probe is sheathed in a protective, disposable cover before being inserted into a patient's mouth, axilla or rectum. Using predictive techniques, the patient's temperature reading is taking a significantly shorter time period, for example thirty seconds, compared to several minutes required for conventional Mercury thermometers. Also, the electronic thermometer in some instances provide more accurate temperature readings than Mercury thermometers.

Although electronic thermometers provide relatively more accurate temperature readings than Mercury thermometers, they nevertheless share many of the same drawbacks. For example, even though electronic thermometers provide faster readings, a half minute must still pass before an accurate reading can be taken. Finally, electronic thermometers must still be inserted into the patient's mouth or rectum which can cause patient discomfort or adversely affect temperature reading accuracy if the probe is moved during the course of measurement.

Tympanic thermometers provide nearly instantaneous and accurate reading of core temperature without the undue delay attendant with other thermometers. The tympanic membrane is generally considered by the medical community to be superior to oral, rectal or axillary sites for taking a patient's temperature. This is because the tympanic membrane is more representative of the body's internal or core temperature and more responsive to changes in core temperature. Tympanic thermometers, those thermometers that sense the infrared emissions from the tympanic membrane, offer significant advantages over Mercury or conventional electronic thermometers.

Recent efforts to provide a method and apparatus for measuring body temperature inside the tympanic membrane have produced several excellent tympanic thermometers. For example, U.S. Pat. No. 5,293,877 to O'Hara et al. provides for a tympanic thermometer that measures internal body temperature utilizing the infrared emissions from the tympanic membrane and within the ear canal itself, and is herein incorporated by reference in its entirety.

The tympanic thermometer of O'Hara et al. is comprised of a probe unit that has a handle and a probe head body terminated in a probe tip which is inserted into the external ear canal. The handle houses a circuit board that controls the operation of the thermometer and a display that displays temperature readings and other information. The probe head body is attached to the distal end of the circuit board and houses a seal assembly, optical waveguide tube, infrared filter and thermopile detector. The probe head body further includes a first bore in communication with a second narrower second bore. The distal end of the first bore forms a tip with an opening thereto for passing infrared emissions from the tympanic membrane into the probe head body. The infrared filter is mounted in the opening and rejects unwanted emissions while the optical waveguide tube conducts the infrared emissions to the thermopile detector located at the proximal end of the tube. In order to prevent contamination from entering the probe head body, a seal assembly is also provided that furnishes a watertight barrier against liquid and debris from entering through the interface between the probe tip and the infrared filter.

The user operates the thermometer by inserting the probe tip into the patient's ear canal and depressing the SCAN button once the probe tip is properly seated inside the ear canal. At this point, infrared emissions from the tympanic membrane are filtered through the infrared filter and conducted by the optical waveguide tube until detected by the thermopile detector. Actuating the SCAN button also alerts the microcomputer that the tympanic comparative computation algorithm should commence. Once the microcomputer is alerted, it starts acquiring the thermopile output level at a rate of approximately seven times per second and stores the maximum temperature reading for display to the user. However, being electronic devices tympanic thermometers still suffer from the effects of nearby sources of electromagnetic interference.

It is well known in the electronic art that circuits and other electronic devices, like tympanic thermometers, may be adversely affected by the presence of electromagnetic interference. By definition, electromagnetic interference is an unwanted electromagnetic signal which may degrade the performance of an electronic device by creating undesirable voltages or currents in the device's circuitry. The cause of an electromagnetic interference problem is usually an unplanned coupling between an electromagnetic source and a receptor by means of a transmission path. Such a transmission path may be conducted or radiated. Conducted interference occurs by means of metallic path wherein an electrical device is connected to a power source while radiated interference occurs by means of near- and far-field electromagnetic field coupling. It is the latter type of interference that poses the most trouble to medical devices in hospitals.

Sources of radiated interference usually originate from transmitters and other similar types of communication equipment, especially cellular phones. In a hospital or clinical environment, almost all electronic medical devices are designed to sufficiently suppress or reduce most interference generated by an electromagnetic signal in that particular environment. However, mobile radio transmitters and cellular phones radiate particularly high levels of electromagnetic interference, especially where in close proximity to an electronic medical device. In addition, many common medical devices emit EMI and can themselves pose a threat to other medical equipment. These potential sources of EMI include diathermy units, magnetic resonance imaging (MRI) systems, lasers and cauterizers.

In particular, the front-end circuitry of tympanic thermometers which senses the core body temperature of a patient is especially susceptible to EMI radiated by these aforementioned sources. A doctor, for example, operating a cauterizer next to a nurse who is taking a temperature reading using a tympanic thermometer will generate sufficient EMI from the cauterizer to adversely influence the accuracy of the temperature reading taken by the thermometer's probe. The problem faced by medical practitioners in using tympanic thermometers is that the practitioner does not know when an inaccurate temperature reading has been taken in the presence of a high electromagnetic environment because there is usually no outward indication from the tympanic thermometer that the temperature reading is in error. Further, conventional methods of suppressing electromagnetic interference, like shielding and filtering, are insufficient in addressing the problem because the thermometer's circuitry cannot be properly shielded from a close EMI source since shielding merely attenuates, but does not eliminate the interference.

As of yet, nothing in the prior art has addressed the problem of developing an electromagnetic interference detector that gives an outward indication that a tympanic thermometer is being operated in a high electromagnetic environment and prevents the thermometer from taking a temperature reading.

Therefore, there exists a need in the medical device art for a stability indicator that detects and warns the practitioner of the presence of high EMI while disabling the apparatus from taking a temperature until the EMI event has passed.

SUMMARY OF THE INVENTION

In brief summary, the present invention relates to a stability indicator for a tympanic thermometer that warns the practitioner that the thermometer is being used in a high electromagnetic environment and prevents the taking of a temperature reading until the EMI event has passed.

Accordingly, it is the principal object of the present invention to provide a novel and accurate means for the detection of EMI in the vicinity of the thermometer body.

A further object of the present invention is to provide an outward indication to the user that the thermometer is being operated in a high electromagnetic environment.

Another paramount object of the present invention is to provide a fail-safe circuit for preventing the taking of a temperature reading in a high electromagnetic environment.

These and other objects of the present invention are realized in a presently preferred embodiment thereof, described by way of example and not necessarily by way of limitation, which provides for a stability indicator for detecting and indicating the presence of EMI in the vicinity of the thermometer body while preventing the taking of core body temperatures by the thermometer.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION

As shown in the exemplary drawings for the purposes of illustration, an embodiment of an electromagnetic stability indicator made in accordance with the principles of the present invention, referred to generally by reference 10, is provided for sensing and indicating the presence of EMI by a tympanic thermometer and prevent the taking of a temperature reading by the thermometer until the EMI event has passed.

Figure 1:
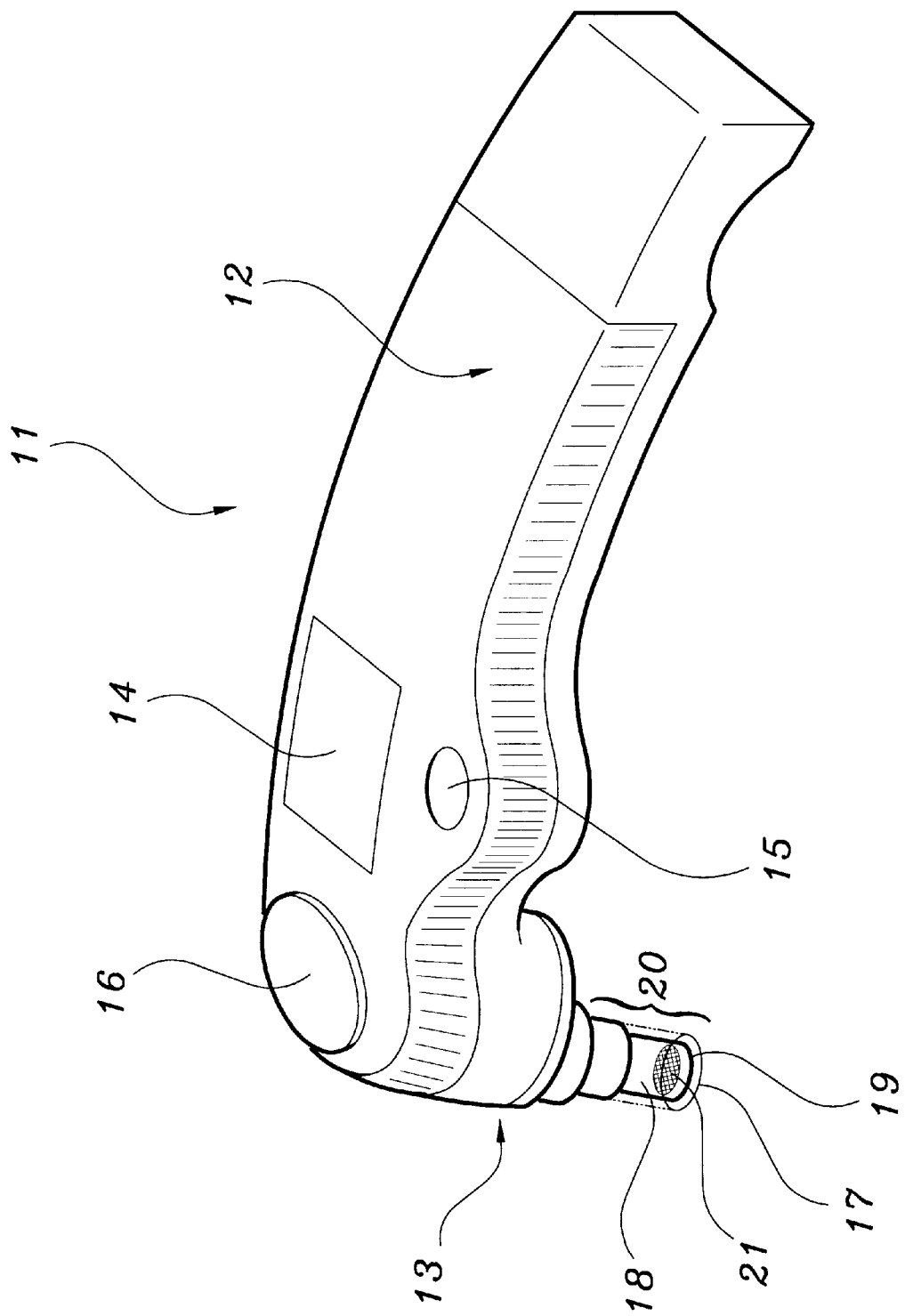
FIG. 1 is a top view of the tympanic thermometer showing the display according to the present invention.

A prior art tympanic thermometer 11 is shown in FIG. 1. The basic hardware configuration of tympanic thermometer 11 comprises a thermometer body 12 and a probe head 13. Thermometer body 12 includes a display 14 for displaying information to the user, a SCAN button 15 for initiating the taking of a temperature reading by tympanic thermometer 11, and an EJECT RELEASE button 16 for ejecting a probe cover 17 from the probe head 13 after a temperature reading has been taken.

Probe head 13 includes a probe head seal 20 that comprises an assembly of seal components (not shown) which seal off the probe head 13 and prevents water and other contaminants from entering the interior portion of probe head 13. The distal end of probe head 13 also includes a probe head extension 18 which is adapted to be inserted into the ear canal of a patient when a temperature reading is to be taken. The probe head extension 18 comprises a probe tip 19 which forms an aperture therethrough where an infrared filter 21 is seated therein for filtering ambient light that enters through tip 19. Probe head 13 also houses front end circuitry 22 which permits tympanic thermometer 11 to sense a high EMI event through the electrical interconnection traces and the ground plane located therein. A more detailed description of the probe head seal 20 is found in applicant's co-pending U.S. Patent Provisional Application Ser. No. 60/003,240 to Vodzak et al. entitled "Titanium Probe Tip with Watertight Seal" and is hereby incorporated by reference in its entirety.

In brief, tympanic thermometer 11 is operated by engaging a sterile probe cover 17 onto the distal end of probe head extension 18 and placing extension 18 into the ear canal of a patient (not shown). Once the probe head extension 18 is properly inserted inside the ear canal, the user presses down on SCAN button 15 and thermometer 11 instantly takes a core temperature reading from the patient's tympanic membrane and displays the same on display 14. A more detailed description of the prior art tympanic thermometer and its related method of use is disclosed in U.S. Pat. No. 4,790,324 to O'Hara et al. entitled "Method and Apparatus for Measuring Internal Body Temperature Utilizing Infrared Emissions" and is hereby incorporated by reference in its entirety.

Figure 2:
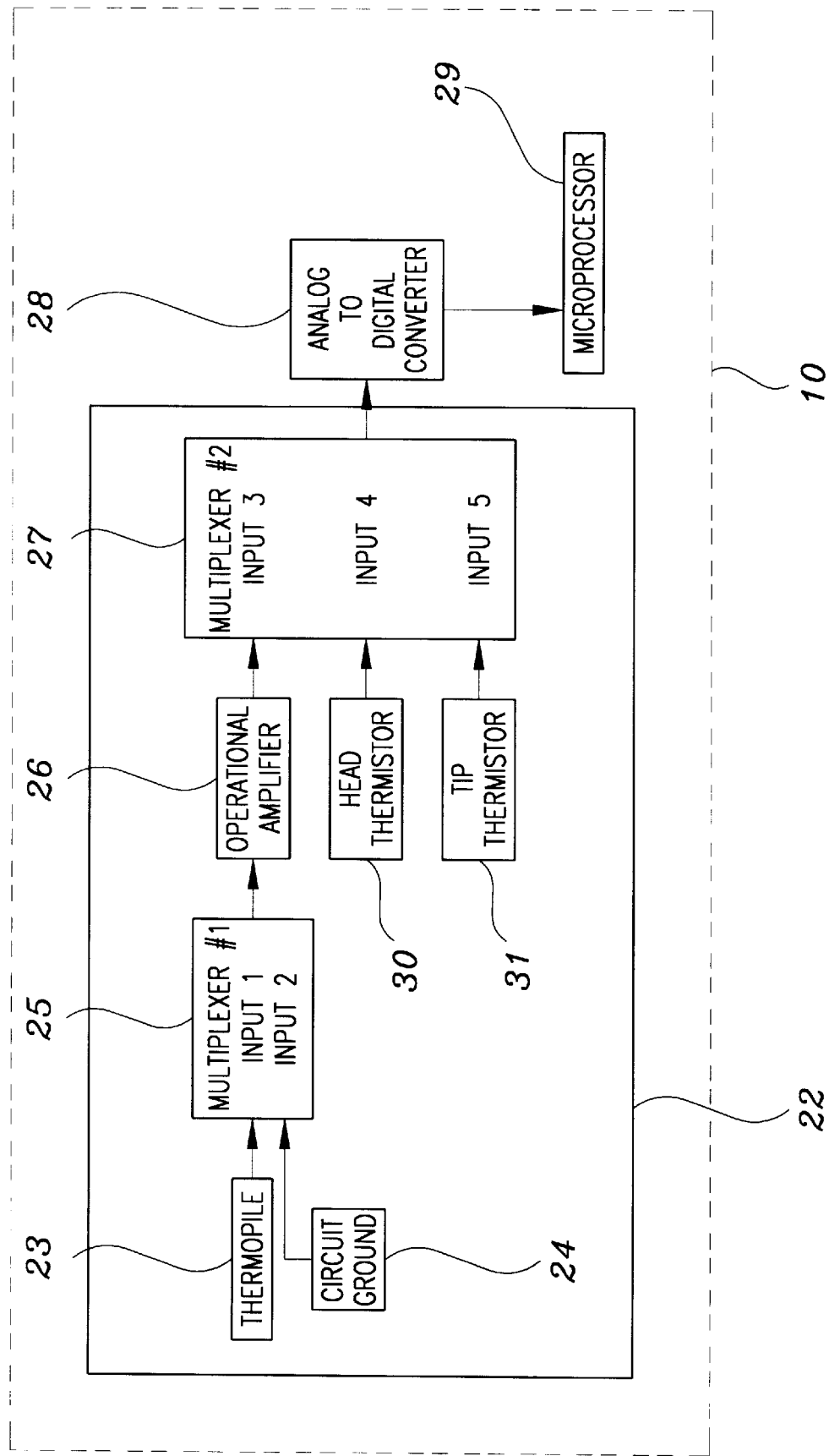
FIG. 2 is a block diagram showing the front-end circuitry of the tympanic thermometer according to the present invention.

Referring to FIG. 2, front-end circuitry 22 of the probe head 13 showing the electronics of EMI stability indicator 10 is illustrated in functional block form. Thermopile detector 23 is connected to an operational amplifier 26 through a first multiplexer 25 at input I1 while a circuit ground 24 is also connected to amplifier 26 through an input I2 of multiplexer 25. Thermopile detector 23 is preferably a commercial detector, 2MCLWPXE, manufactured by DEXTER Research of Dexter, Mich., for sensing infrared radiation, however any suitable infrared detector is felt to fall within the scope of the present invention. Circuit ground 24 is a simple circuit ground connected to the non-inverting input of operational amplifier 26 and provides a means of measuring offset voltages inherent in operational amplifier 26 so that such offset voltages can be subtracted from the thermopile readings taken from thermopile detector 23. An offset voltage is defined as the voltage required to reduce the DC output voltage of amplifier 26 to zero if the amplifier is connected to a circuit ground. By subtracting the offset voltage from the thermopile reading, a more accurate temperature reading from the patient's tympanic membrane is achieved. Further, circuit ground 24 is used as a means of sensing the presence of high EMI event in the vicinity of thermometer body 12 by repeatedly measuring the circuit ground 24 input for offset voltages and comparing those input readings to a preset reference value or predetermined threshold found in a microcontroller 29. If the difference in the maximum and minimum offset voltages any one input reading meets or exceeds the preset reference value found in a EEPROM 32 (not shown) of microcontroller 29, microcontroller 29 directs an error condition be written to display 14 and prevents a temperature reading from being calculated. Preferably, microcontroller 29 is a HD4074808 manufactured by Hitachi of America Limited of Brisbane, Calif., however any microprocessor suitable for sampling sensor inputs is felt to fall within the scope of the present invention.

Operational amplifier 26 is a high gain amplifier that amplifies the voltage reading from thermopile detector 23 when the first multiplexer is set at input I1. At input I2, the operational amplifier 26 is connected to ground so that any output from amplifier 26 reflects offset voltages generated in amplifier 26. These offset voltages are then subtracted from the thermopile detector 23 reading in order to give an accurate temperature of the tympanic membrane. Second multiplexer 27 is connected to operational amplifier 26 through an input I3 for sending the thermopile detector 23 readings and offset voltages to microcontroller 29 through an analog to digital converter 28. Further, second multiplexer 27 has two other inputs, I4 and I5, for connecting the head thermistor 30 and the tip thermistor 31 respectively to the analog to digital converter 28. Thus, second multiplexer 27 channels one of three inputs, I3, I4 and I5, through to analog to digital converter 28 at any one time.

Analog-to-digital converter 28 converts the analog signals sent through multiplexer 27 into digital signals and transmits these signals to microcontroller 29. Preferably, analog-to-digital converter 28 is a model TSC500 dual slope integrating analog-to-digital converter manufactured by Telcom Semiconductor of Mountain View, Calif. and first and second multiplexers 25, 27 are a model 74HC4052 manufactured by Texas Instruments of Dallas, Tex., however any analog-to-digital converter or multiplexer suitable for converting and channeling sensor inputs is felt to fall within the scope of the present invention. Finally, operational amplifier 26 is preferably a model OP-177 manufactured by Analog Devices of Norwood, Mass., however any operational amplifier with a low internal noise characteristic suitable for adding a large gain to a sensor signal is felt to fall within the scope of the present invention.

Figure 3:
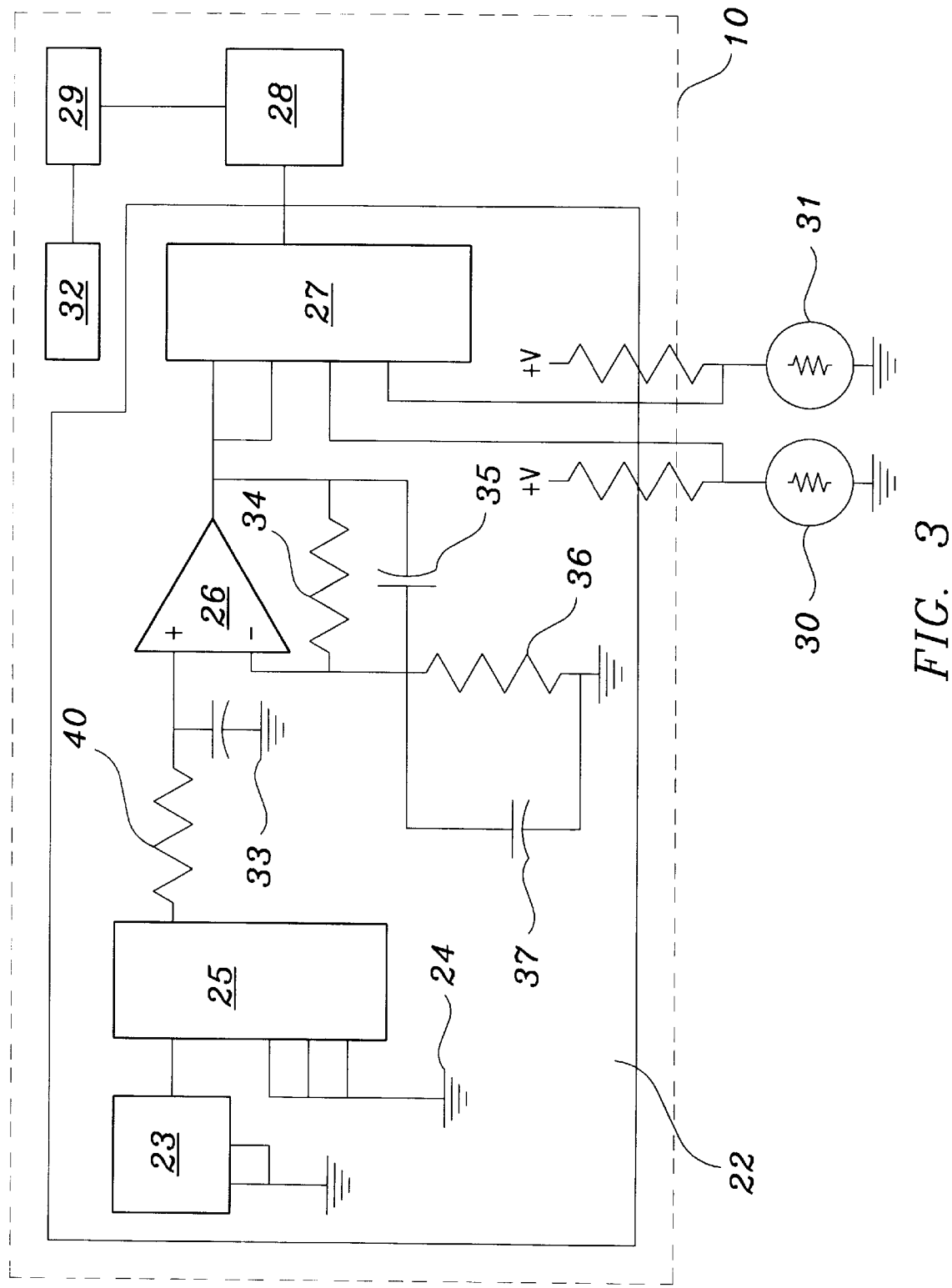
FIG. 3 is a circuit diagram of the front end circuitry according to the present invention.

Referring to FIG. 3, a more detailed description of the operation and structure of front-end circuitry 22 is shown. First multiplexer 25 may select one of two inputs, I1 and I2, for channeling through operational amplifier 26. When the input I1 is selected, thermopile detector 23 generates a voltage output signal which is proportional to the net infrared radiation incident upon detector 23 coming from an infrared source such as the tympanic membrane. The switch to input I1 by first multiplexer 25 causes a low impedance path from thermopile detector 23 to one side of first resistor 40 so that the thermopile detector 23 is electrically connected to the operational amplifier 26. Further, the combination of first resistor 40 and first capacitor 33 between first multiplexer 25 and operational amplifier 26 form a low pass filter which passes low frequency signals so that noise outside the bandwidth of the voltage output signal is attenuated and a clean signal is generated. Preferably, first resistor 33 is a conventional 100 ohm resistor and first capacitor 33 is a standard 0.1 microfarad capacitor.

The operational amplifier 26 is configured as an active low pass filter such that when the signals are passed through amplifier 26 the circuit noise in each signal is effectively reduced. To accomplish this low pass filtering, a second resistor 34 is placed in parallel with a second capacitor 35 and a third resistor 36 is placed in parallel with a third capacitor 37, thereby forming first and second combinations. First and second combinations are then placed in series with one another, thus forming an effective low pass filtering circuit for signals passing through operational amplifier 29. Preferably, second resistor 34 is a 40.2 K Ohm conventional resistor, second capacitor 35 is a standard 0.1 microfarad capacitor, third resistor 36 is a 100 ohm conventional resistor and third capacitor 37 is a standard 0.1 microfarad capacitor.

Second multiplexer 27 receives input from operational amplifier 26, head thermistor 30 and tip thermistor 31 and selectively outputs these three inputs, I3, I4 and I5 respectively, to an analog-to-digital converter 28 to digitize and forward these outputs to microcontroller 29. Information from head thermistor 30, tip thermistor 31 and thermopile detector 23 are used in combination with calibration coefficients retrieved in the EEPROM 32 for the purpose of determining the final temperature of a tympanic membrane.

Figure 4:
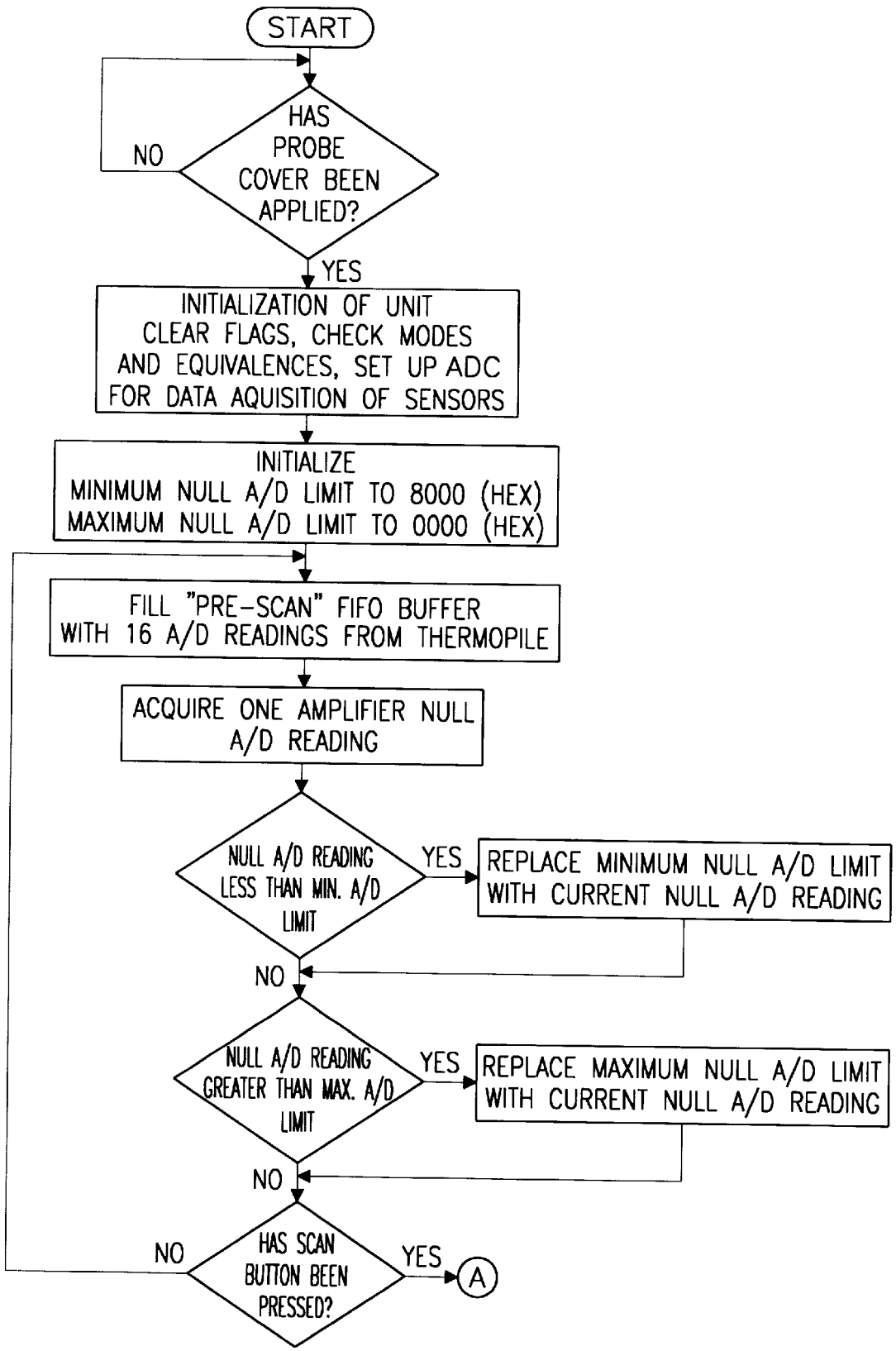
FIGS. 4–6 are flow charts showing the software routine and sub-routines for the detection, display and disabling features according to the present invention.
Figure 5:
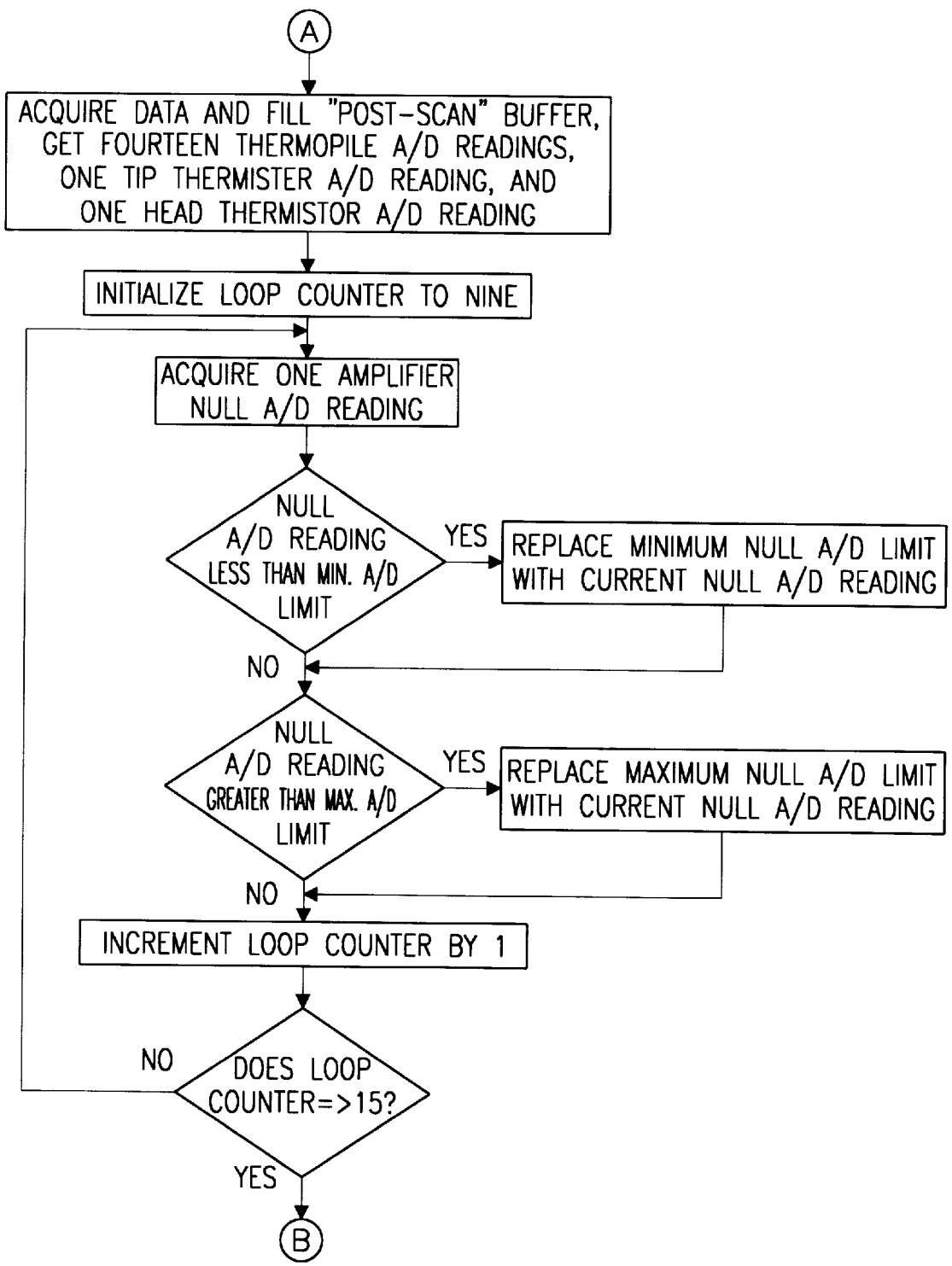
Figure 6:
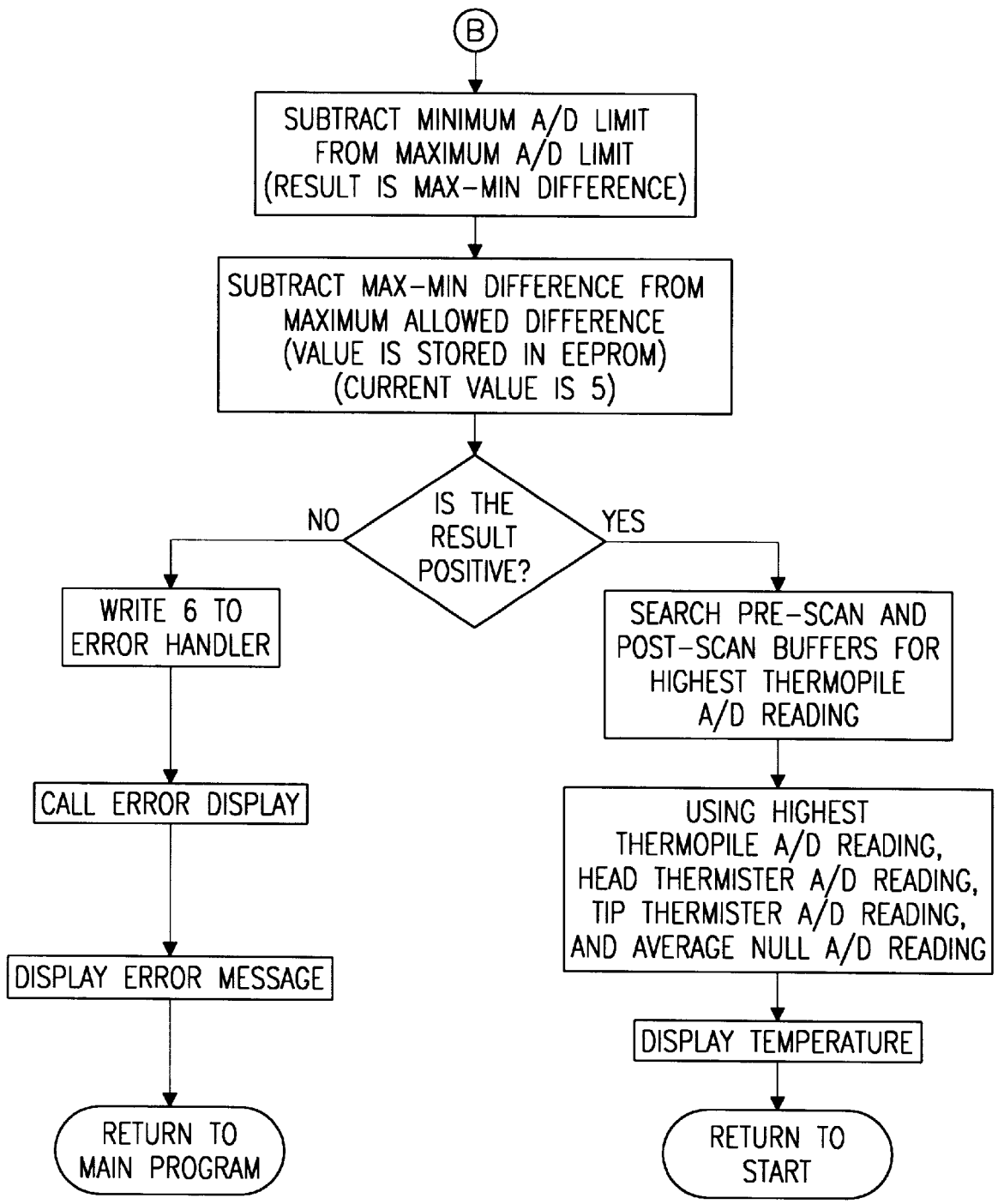

Referring to FIGS. 4–6, a detailed description of the software routine and subroutines used to determine both the temperature of the tympanic membrane and whether there is interfering EMI in the vicinity of tympanic thermometer 11 that exceeds the predetermined threshold is shown in flow chart format. When the user engages the probe cover 17 to the probe head extension 18, microcontroller 29 initializes a data buffer inside microcontoller's 29 Random Access Memory (RAM) (not shown) and clears flags in the RAM, checks modes and equivalences, and sets up the Analog-to-Digital Converter 28 for data acquisition from the thermopile 23 and head and tip thermistors 30,31. Microprocessor 29 further initializes the minimum null A/D to 8000 (in hexadecimal) and the maximum null A/D to 0000 (also in hexadecimal) so that the lowest possible maximum null A/D value is initialized and the highest possible minimum null A/D value. By initializing the minimum and maximum null A/D values in this manner, at least one maximum and minimum null A/D reading is retained in the data buffer.

After the data buffer is fully initialized, microprocessor 29 takes a plurality of voltage output readings and stores these readings in the data buffer prior to the user actuating SCAN button 15. Further, after the voltage output readings have been stored, microcontroller 29 instructs first multiplexer 25 to select input I2 which causes a low impedance path between ground and first resistor 40. This selection grounds the input to operational amplifier 26 so that any voltage present in the output is due to offset voltages generated inside operational amplifier 26. Once input I2 has been selected, software within microcontroller 29 establishes a "pre-scan" loop subroutine that takes one or more null input readings of circuit ground 24 per loop subroutine and sends these readings through operational amplifier 26 where the reading is soon after digitized by an analog-to-digital converter 28. The loop subroutine provides microcontroller 29 with sufficient null input readings for establishing a minimum and maximum reference values for null input readings prior to the user pressing SCAN button 15.

Once the user presses SCAN button 15, microcontroller 29 will terminate the "pre-scan" subroutine and direct the microcontoller 29 to enter a subroutine A. In subroutine A, microcontroller 29 fills a "post-scan" buffer with a set of voltage output readings, a single tip thermistor reading from a tip thermistor 31 and single head thermistor reading from a head thermistor 30. Microprocessor 29 then calculates the final temperature of a tympanic membrane. Preferably, microcontroller 29 takes 14 voltage output readings when a set of readings are taken, however any suitable number of readings that permit microcontroller 29 to accurately determine the temperature of the tympanic membrane is felt to fall within the scope of the present invention. Once all these sensor readings have been taken for the purpose of temperature measurement, microprocessor 29 then determines whether sufficient EMI is present that would interfere with the accuracy of the temperature being taken by tympanic thermometer 11.

To determine whether sufficient EMI is present, microcontroller 29 first enters a subroutine B and initializes a feedback loop counter to a count of 9. After initialization of the counter, microcontroller 29 then enters into a "post-scan" loop where one offset voltage reading is taken and compared against maximum and minimum offset voltage values previously stored in the data buffer during the "prescan" loop. If the one offset voltage reading exceeds either the maximum or minimum offset voltage values stored, then that new offset voltage reading will replace the maximum or minimum value in the data buffer therein. After the minimum and maximum values are determined, the counter is increased by an increment of one and the "post-scan" loop returns and acquires another single offset voltage reading. The "post-scan" loop will continue to update the maximum and minimum offset voltage values until the counter reaches a count of 15. Once the counter reaches 15, microcontroller 29 enters a subroutine C.

In subroutine C a Maximum-Minimum Difference is determined by subtracting the minimum offset voltage value from the maximum null input value stored in the data buffer. Once the Maximum-Minimum Difference is determined, that difference is compared against a pre-determined Maximum Allowed Difference stored in EEPROM 32. Preferably, the pre-determined Maximum Allowed Difference or pre-determined threshold stored in the EEPROM 32 is 6 A/D counts, although any suitable number of A/D counts for determining a pre-determined Maximum Allowed Difference is felt to fall within the spirit and scope of the present invention.

If the value derived from subtracting the Maximum-Minimum Difference from the Maximum Allowed Difference is a negative value, then microcontroller 29 writes a numeral "6" to an error handler (not shown) which calls the error message and displays it at display 14. However, if the above value turns out to be a positive value, then there isn't a sufficient EMI event present in the vicinity of tympanic thermometer 11 that would interfere with its operation and microcontroller 29 directs that the temperature of the tympanic membrane be calculated and displayed. To determine the tympanic membrane temperature, microcontroller 29 searches both the "pre-scan" and "post-scan" information previously stored in the data buffer and acquires the highest voltage output reading from thermopile 23, head thermistor reading, tip thermistor reading and an average null A/D reading. Once this information is gathered, microcontroller 29 calculates the tympanic membrane temperature using a polynomial equation stored in the microcontroller's 29 memory (not shown) and displays that temperature at display 14. Once the temperature is displayed the software routine returns to START.

Although particular embodiments of the invention have been shown, it is not intended that the invention be limited thereby, instead, the scope of the present invention is intended to be limited only by the appended claims.

We claim:

1. A stability indicator for use in a thermometer, said indicator detecting the presence of a high electromagnetic field in the vicinity of a thermometer body, said indicator comprising:

a detection circuit for detecting the presence of the high electromagnetic field, said detection circuit including various circuit components, said detection circuit further including a null input operatively connected to one of said circuit components for registering the presence of a high electromagnetic event, said null input registering an offset voltage in the presence of a high electromagnetic event;

a microprocessor, said microprocessor in communication with said detection circuit for reading a plurality of said offset voltages, said microprocessor determining whether the difference in the maximum and minimum values of said offset voltages detected by said detection circuit exceeds a predetermined threshold, said predetermined threshold being a preset value stored in the microprocessor which establishes a point beyond where the thermometer is unable to take an accurate core body temperature;

a disabling means for preventing the display of a core body temperature when said difference in said offset voltages exceeds said preset value; and a display for displaying a message.

2. The stability indicator according to claim 1, wherein said display displays a core body temperature reading when said offset voltage does not exceed said preset value.

3. The stability indicator according to claim 1, wherein said detection circuit includes a probe sensor and an operational amplifier in series with an analog-to-digital converter.

4. The stability indicator according to claim 3, wherein said detection circuit further includes a switch, said switch changing the input to said operational amplifier between a first position and a second position, said first position establishing a ground at said input to said operational amplifier, thereby creating a null input thereto, said second position terminating said ground and establishing a link between said probe sensor and said operational amplifier for taking a temperature reading.

5. The stability indicator according to claim 4, wherein in the first position said detection circuit senses a plurality of offset voltage readings at said null input created by the presence of an electromagnetic field.

6. The stability indicator according to claim 4, wherein said switch switches to said first position when the thermometer is turned on and before a temperature reading is taken.

7. A stability indicator for use in tympanic thermometers, said indicator detecting the presence of a high electomagnetic field in the immediate area of thermometer body, said indicator comprising:

a detection circuit including an operational amplifier in series with an analog to digital converter, said detection circuit further including a switch for changing an input to said operational amplifier between a first position and a second position, said first position establishing a ground at said input to said operational amplifier, thereby creating a null input thereto, said second position terminating said ground and establishing a link between a probe sensor and said operational amplifier for taking a temperature reading;

a display for displaying a message; and a microprocessor having a memory and a sensor, said microprocessor sensing a plurality of offset voltages from said null input of said amplifier when the thermometer is turned on and switched to the first position, whereby in the first position said microprocessor determines the difference between the maximum and minimum offset voltage readings detected from said null input, if said difference is greater than a predetermined threshold, said predetermined threshold being a preset value stored in the microprocessor which establishes a point beyond where the thermometer is unable to take an accurate core body temperature then said display displays only a warning message, if said difference is less than said predetermined threshold then said switch switches said detection circuit from said first position to said second position.

8. The stability indicator according to claim 7, wherein in the second position said sensor senses any voltage spikes at said null input created by the presence of an electromagnetic field, said sensor communicating the presence of an electromagnetic field to said microprocessor.

9. A stability indicator for use in thermometers, said indicator detecting the presence of a high electromagnetic field in the immediate area of the thermometer body, said indicator comprising:

a detection means for detecting the presence of a high electromagnetic field by detecting a plurality of offset voltages from a circuit ground;

a microprocessor means for determining whether the difference in values of said offset voltages detected by said detection means exceeds a predetermined threshold, said predetermined threshold being a preset value stored in the microprocessor which establishes a point beyond where the thermometer is unable to take an accurate core body temperature; and a display means for displaying messages communicated by said microprocessor means a disabling means for preventing the display of a core body temperature when said difference in said offset voltages exceeds said preset value.

10. The stability indicator according to claim 9 wherein said detection means includes a sensing means and an operational amplifier in series with an analog to digital converter.

11. The stability indicator according to claim 10, wherein said detection means includes a switching means, said switching means changing the input to said operational amplifier between a first position and a second position, said first position establishing a ground at said input to said operational amplifier, thereby creating a null input thereto, said second position terminating said ground and establishing a link between a probe sensor and said operational amplifier for taking a temperature reading.

12. The stability indicator according to claim 11, wherein the first position said sensor senses any voltage variations at said null input created by the presence of an electromagnetic field, said sensor communicating the presence of an electromagnetic field to said microprocessor means.

13. The stability indicator according to claim 10, wherein said switching means switches to said first position when the thermometer is turned on and before a temperature reading is taken.

14. The stability indicator according to claim 9, wherein said sensing means takes a plurality of readings from said null input.

15. A method for determining the presence of a high electromagnetic field in the immediate vicinity of a electric thermometer that includes a detection circuit which detects offset voltages from a circuit ground, a microprocessor including a memory, the steps of the method comprising:

a) detecting a plurality of offset voltages from said circuit ground;

b) communicating said offset voltages to the microprocessor;

c) determining the maximum and minimum differences in said offset voltages;

d) comparing said difference in said offset voltage values against a preset value residing in the memory of the microprocessor, said preset being a value which establishes a point beyond where the thermometer is unable to take an accurate core body temperature; and e) a disabling means for preventing the taking of a core body temperature by the electric thermometer if said difference in said offset voltage values exceeds said preset value.

* * * * *

UNITED STATES PATENT AND TRADEMARK OFFICE
CERTIFICATE OF CORRECTION

PATENT NO : 5,991,700
DATED : November 23, 1999
INVENTOR(S) : Bradford G. Clay et al.

It is certified that error appears in the above-identified patent and that said Letters Patent is hereby corrected as shown below:

On title page, item 57 ABSTRACT
 replace "directs the display the"
 with --directs the display of the--.

Col. 1, line 35
 replace "taking"
 with --taken--.

Col. 1, line 39
 replace "provide"
 with --provides--.

Col. 2, line 14
 replace "with a second"
 with --with a--.

Col. 5, line 21
 replace "voltages any"
 with --voltages of any--.

Signed and Sealed this

Twenty-third Day of May, 2000

Q. TODD DICKINSON

Attest:

Attesting Officer    Director of Patents and Trademarks